United States Patent
Wirsch, Jr. et al.

(10) Patent No.: US 10,316,898 B2
(45) Date of Patent: Jun. 11, 2019

(54) METHOD AND DISCONNECTOR FOR DISCONNECTING A DRIVE SHAFT

(71) Applicant: GE Aviation Systems LLC, Grand Rapids, MI (US)

(72) Inventors: Paul James Wirsch, Jr., Springboro, OH (US); Richard John Veracco, Miamisburg, OH (US); Fayad Mohammed, Cincinnati, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 588 days.

(21) Appl. No.: 15/008,817

(22) Filed: Jan. 28, 2016

(65) Prior Publication Data

US 2017/0219019 A1 Aug. 3, 2017

(51) Int. Cl.
| | |
|---|---|
| *F16D 9/02* | (2006.01) |
| *F02C 7/32* | (2006.01) |
| *H02K 7/00* | (2006.01) |
| *F02C 7/36* | (2006.01) |
| *F02C 7/277* | (2006.01) |
| *H02K 7/18* | (2006.01) |

(52) U.S. Cl.
CPC .............. *F16D 9/02* (2013.01); *F02C 7/277* (2013.01); *F02C 7/32* (2013.01); *F02C 7/36* (2013.01); *H02K 7/003* (2013.01); *F05D 2240/60* (2013.01); *F05D 2260/311* (2013.01); *F05D 2260/38* (2013.01); *H02K 7/1823* (2013.01)

(58) Field of Classification Search
CPC ........ F02C 7/32; F02C 7/36; F05D 2220/323; F05D 2240/60; F05D 2260/38; F16D 9/00; F16D 9/02; H02K 7/1823; Y10T 403/11

USPC .......................................... 464/30–32; 403/2
See application file for complete search history.

(56) References Cited

U.S. PATENT DOCUMENTS

| | | | | | |
|---|---|---|---|---|---|
| 2,727,371 | A | * | 12/1955 | Troeger | F16D 9/00 464/32 |
| 2,862,375 | A | * | 12/1958 | Miller | F16D 9/00 464/32 |
| 3,237,741 | A | * | 3/1966 | Gartner | F16D 9/06 464/31 |
| 3,427,826 | A | * | 2/1969 | Anderson | F16D 9/00 464/32 |
| 3,675,444 | A | | 7/1972 | Whipple | |
| 3,714,779 | A | | 2/1973 | Stein et al. | |
| 3,889,789 | A | * | 6/1975 | Boehringer | F16D 9/02 464/31 |
| 4,086,991 | A | * | 5/1978 | Swadley | F16D 9/02 464/31 |

(Continued)

FOREIGN PATENT DOCUMENTS

| | | |
|---|---|---|
| EP | 0540192 A1 | 5/1993 |
| GB | 839961 A1 | 6/1960 |

(Continued)

*Primary Examiner* — Josh Skroupa
(74) *Attorney, Agent, or Firm* — McGarry Bair PC

(57) ABSTRACT

A method and disconnector for disconnecting a drive shaft of a drive mechanism from rotating equipment, upon a failure of the drive mechanism or rotating equipment, includes a housing, an arm extending from the housing and movable relative to the housing between a first position and a second position, and a parting tool on a distal end of the arm.

20 Claims, 6 Drawing Sheets

(56) References Cited

U.S. PATENT DOCUMENTS

| | | | |
|---|---|---|---|
| 4,271,947 A * | 6/1981 | Gaeckle | F16D 9/02 464/31 |
| 4,281,942 A | 8/1981 | Gaeckle et al. | |
| 4,392,835 A * | 7/1983 | Siddiqui | F16D 9/00 464/30 |
| 4,525,995 A | 7/1985 | Clark | |
| 4,724,331 A | 2/1988 | Nordlund | |
| 4,797,590 A | 1/1989 | Raad et al. | |
| 4,990,807 A | 2/1991 | Flygare et al. | |
| 5,103,949 A * | 4/1992 | Vanderzyden | F16D 9/02 192/101 |
| 5,191,254 A | 3/1993 | Raad et al. | |
| 5,555,722 A | 9/1996 | Mehr-Ayin et al. | |
| 6,058,791 A | 5/2000 | Brunet | |
| 6,204,577 B1 | 3/2001 | Chottiner et al. | |
| 6,364,772 B1 | 4/2002 | Sugden | |
| 6,838,778 B1 | 1/2005 | Kandil et al. | |
| 7,055,664 B2 * | 6/2006 | Skorucak | F16D 9/02 464/31 |
| 7,131,275 B2 | 11/2006 | Gustafson | |
| 7,296,670 B2 * | 11/2007 | Howard | F16D 9/02 464/31 |
| 7,351,174 B2 | 4/2008 | Beutin et al. | |
| 7,495,361 B2 | 2/2009 | Brouillet et al. | |
| 7,656,054 B2 | 2/2010 | Lardellier | |
| 2004/0106486 A1 | 6/2004 | Jonsson | |
| 2006/0087123 A1 | 4/2006 | Stout et al. | |
| 2006/0248865 A1 | 11/2006 | Latulipe et al. | |
| 2008/0053257 A1 | 3/2008 | Dusserre-Telmon et al. | |
| 2009/0309461 A1 | 12/2009 | Berenger et al. | |

FOREIGN PATENT DOCUMENTS

| | | |
|---|---|---|
| WO | 2005073540 A1 | 8/2005 |
| WO | 2007096493 A1 | 8/2007 |

* cited by examiner

METHOD AND DISCONNECTOR FOR DISCONNECTING A DRIVE SHAFT

BACKGROUND OF THE INVENTION

A driving mechanism, such as a motor or engine, can generate driving motions at a mechanism output, such as at a rotatable output shaft. The output shaft can, for example, provide a rotational kinetic motion to another piece of equipment via a rotatable drive shaft connected to the output shaft. The piece of equipment receiving the rotational kinetic motion can utilize the driving rotational motion as an energy source to operate. In one example configuration, a gas turbine engine, also known as a combustion turbine engine, is a rotary engine that extracts energy from a flow of combusted gases passing through the engine onto a multitude of turbine blades. The gas turbine engine can provide at least a portion of the rotational kinetic motion to rotating equipment, such as an accessory gearbox, where the rotational motion is utilized to power a number of different accessories. The accessories can include generators, starter/generators, permanent magnet alternators (PMA) or permanent magnet generators (PMG), fuel pumps, and hydraulic pumps. In the event of failure of the driving mechanism, it can be desirable to decouple the driving mechanism from the rotating equipment.

BRIEF DESCRIPTION OF THE INVENTION

In one aspect, a disconnector for disconnecting a drive shaft of a drive mechanism from rotating equipment, upon a failure of the drive mechanism or rotating equipment, includes a housing, an arm extending from the housing and movable relative to the housing between a first position and a second position, a parting tool on a distal end of the arm, a biasing element mounted to the housing adjacent a proximal end of the arm configured to bias the arm toward the second position, and a meltable element disposed in the housing in a position to restrain the arm in the first position against the bias of the biasing element. When the housing is mounted to at least one of the drive mechanism or rotating equipment, radially spaced from a drive shaft such that the parting tool will contact the drive shaft when the arm is in the second position, a failure in the at least one of the drive mechanism or rotating equipment will cause the meltable element to melt and release the arm for movement to the second position where the parting tool contacts the drive shaft causing a predetermined failure of the drive shaft.

In another aspect, a system of a drive mechanism coupled to a device by a rotating shaft includes a housing mounted to one of the drive mechanism or the device radially from the rotating shaft, an arm extending from the housing and movable relative to the housing between a first position and a second position, a parting tool on a distal end of the arm, a biasing element mounted to the housing adjacent a proximal end of the arm configured to bias the arm toward the second position, and a meltable element disposed in the housing in a position to restrain the arm in the first position against the bias of the biasing element. A failure in one of the drive mechanism or the device will cause the melting element to melt and release the arm for movement to the second position where the parting element of the meltable element will contact the rotating shaft and cause a predetermined failure of the rotating shaft to decouple the drive mechanism from the device.

In yet another aspect, a method of protecting a system from a catastrophic failure where the system includes a drive mechanism coupled to a device by a rotating shaft, includes disposing a housing on one of the drive mechanism or the device radially from the rotating shaft, with an arm extending from the housing and movable relative to the housing between a first position and a second position, a parting tool on a distal end of the arm, a biasing element mounted to the housing adjacent a proximal end of the arm configured to bias the arm toward the second position; and a meltable element disposed in the housing in a position to restrain the arm in the first position against the bias of the biasing element, and if a failure is detected in one of the drive mechanism or the device, causing the meltable element to melt and release the arm for movement to the second position where the parting element of the meltable element will contact the rotating shaft and cause a predetermined failure of the rotating shaft to decouple the drive mechanism from the device.

DETAILED DESCRIPTION OF THE EMBODIMENTS

The present invention is related to a driving mechanism generating kinetic motion in the form of a rotating shaft coupled with a piece of rotating equipment. One non-limiting example of a driving mechanism can include a gas turbine engine rotationally driving a piece of rotating equipment, such as a starter/generator (S/G). The S/G has various applications including starting a gas turbine engine and generating electrical power when the gas turbine engine is in operation. While the exemplary embodiment described herein is directed to application of a gas turbine engine and an S/G, embodiments of the disclosure can be applied to any implementation of a driving mechanism that generates rotational motion at a driving output, and provides the rotational motion to another piece of rotating equipment.

Figure 1:
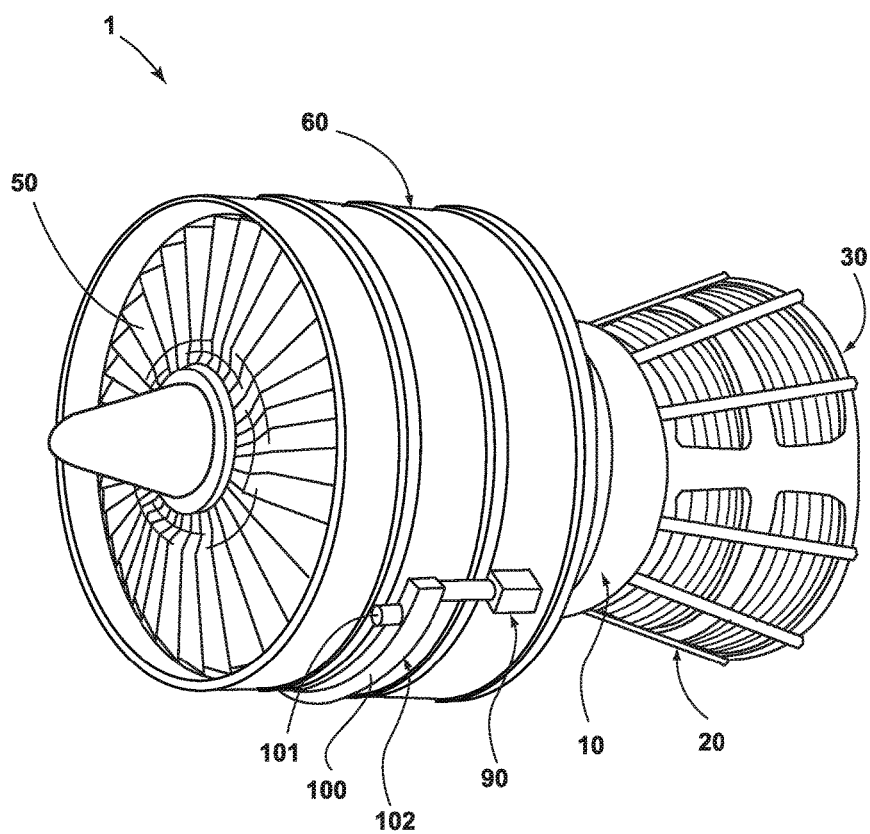
FIG. 1 is a schematic illustration of a gas turbine engine with an accessory gearbox in accordance with various aspects described herein.

Referring to FIG. 1, an assembly 102 comprising an accessory gear box (AGB) 100, also known as a transmission housing, and an S/G 101 is schematically illustrated mounted to a gas turbine engine 1. This assembly is commonly referred to as an Integrated Starter/Generator Gearbox (ISGB). The gas turbine engine 1 comprises an air intake with a fan 50 that supplies air to a high pressure compression region 60. The air intake with a fan 50 and the high pressure compression region collectively are known as the 'cold section' of the gas turbine engine upstream of the combustion. The high pressure compression region 60 provides the combustion chamber 10 with high pressure air. In the combustion chamber, the high pressure air is mixed with fuel and combusted. The hot and pressurized combusted gas passes through a high pressure turbine region 20 and a low pressure turbine region 30 before exhausting from the gas turbine engine. As the pressurized gases pass through the high pressure turbine (not shown) of the high pressure turbine region 20 and the low pressure turbine (not shown) of the low pressure turbine region 30, the turbines extract rotational energy from the flow of the gases passing through the gas turbine engine 1. The high pressure turbine of the high pressure turbine region 20 can be coupled to the compression mechanism (not shown) of the high pressure compression region 60 by way of a shaft to power the compression mechanism. The low pressure turbine can be coupled to the fan 50 of the air intake by way of a shaft to power the fan 50.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 30 to increase the velocity of the exhausted gases, and thereby increasing thrust.

The AGB 100 is coupled to a turbine shaft of the gas turbine engine 1, either to the low pressure or high pressure turbine by way of a mechanical power take-off 90. The mechanical power take off 90 contains multiple gears and means for mechanical coupling of the AGB 100 to the gas turbine engine 1. The assembly 102 can be mounted on the outside of either the air intake region containing the fan 50 or on the core near the high pressure compression region 60.

Figure 2:
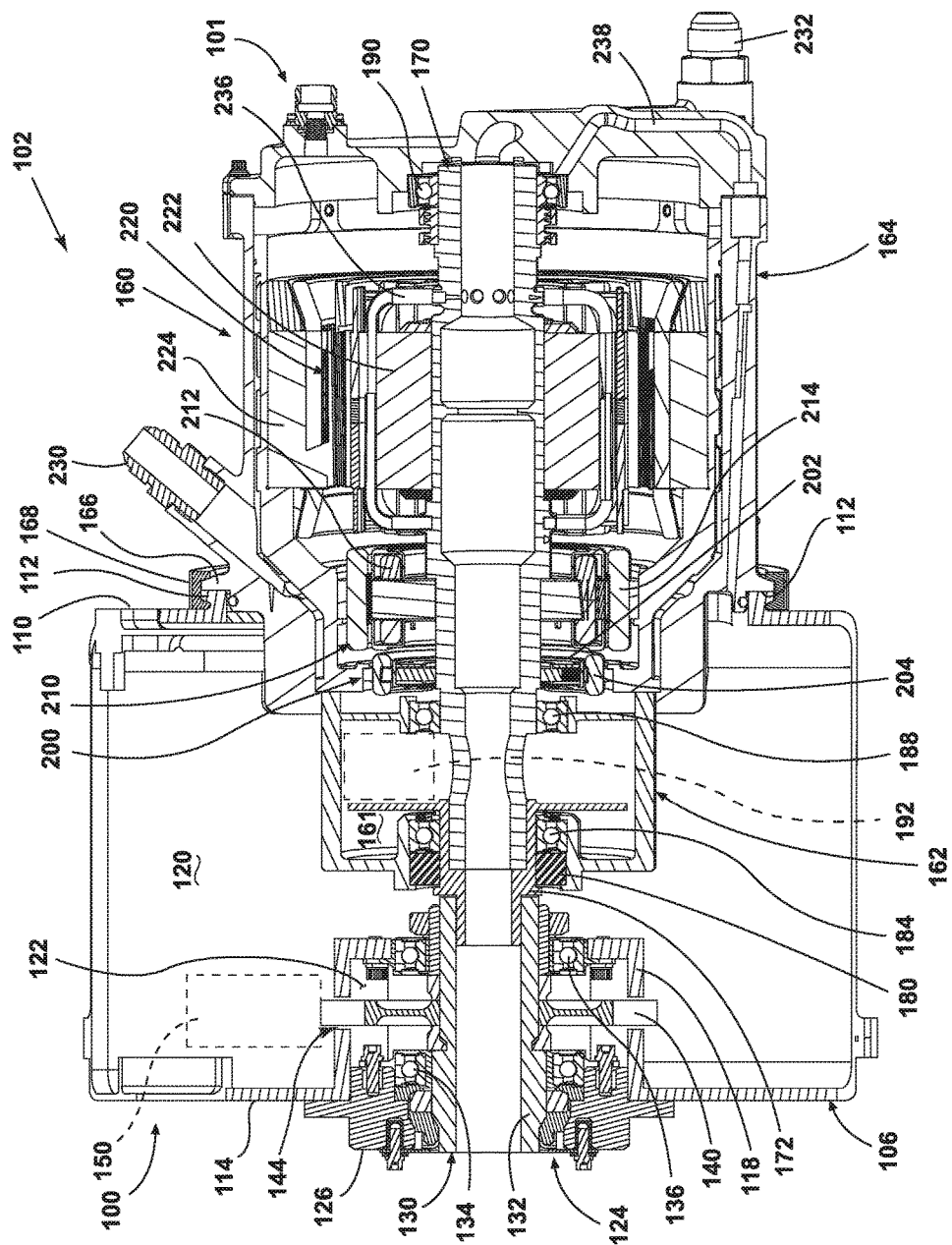
FIG. 2 is a sectional view of a starter/generator mounted to the accessory gearbox of FIG. 1 by way of a rotating shaft, in accordance with various aspects described herein.

Referring now to FIG. 2, the relationship between the S/G 101 and the AGB 100 is shown in greater detail. The AGB comprises a housing 106 with a front AGB wall 110 and an opposing back AGB wall 114 with an AGB interior 120 enclosed therebetween. The back wall 114 of the AGB housing 106 can further comprise an inset cavity 122 with sidewall 118 to accommodate a pinion gear assembly 124 therein. The pinion gear assembly 124 comprises a pinion gear assembly housing 126, a first shaft portion 132 rotatably mounted to the pinion gear assembly housing 126 and supported by a first spaced bearing 134 and a second spaced bearing 136. A pinion gear 140 is carried by the first shaft portion 132 for co-rotation and located between the first spaced bearing 134 and the second spaced bearing 136. There is an aperture 144 in the inset sidewall 118 through which the pinion gear 140 extends and meshes with a drive gear 150 (shown schematically as a dotted rectangle for clarity) driven by a gear train (not shown) coupled to the power take-off 90 of the gas turbine engine 1, such that operation of the engine 1 provides a driving motion to the AGB 100. The pinion gear 140 can be more proximate to the back AGB wall 114 than the front AGB wall 110.

The AGB interior 120 can also contain oil to provide lubrication and cooling to mechanical parts contained therein such as the pinion gear 140, the drive gear 150, and the first and second spaced bearings 134 and 136.

The front wall 110 of the AGB housing further has an opening with an AGB clamping interface 112 at the periphery of the opening to align with an S/G clamping interface 166 on an S/G housing 160 that can be clamped together with clamp 168 to mount the S/G 101 to the AGB 100. When the S/G 101 with S/G housing 160 defining an S/G interior 161 is mounted to the AGB 100, a first S/G housing portion 162 is disposed within the AGB interior 120 and a second S/G housing portion 164 is disposed outside of the AGB interior 120.

The S/G 101 comprises a second shaft portion 170 extending from the S/G interior 161 supported by a third spaced bearings 184, a fourth spaced bearings 188, and a fifth spaced bearings 190. The second shaft portion 170 and the first shaft portion 132 are coupled together with shaft interface portion 172 to form a single rotatable shaft 130. The shaft interface portion 172 can be by any known method of coupling including, but not limited to, gears, splines, a clutch mechanism, or combinations thereof. An example of a shaft interface portion 172 is disclosed in U.S. Pat. No. 4,281,942 to General Electric and is incorporated herein by reference in its entirety.

The second shaft portion 170 carries multiple machines within the S/G interior 161 such as a main machine 220, an exciter 210, and a PMG 200, with the corresponding rotating component comprising a main machine rotor 222, an exciter rotor 212, and a PMG rotor 202, respectively, and the corresponding fixed component comprising a main machine stator 224, an exciter stator 214, and a PMG stator 204. The exciter 210 provides direct current to the field windings of the main machine 220. The main machine 220 and PMG 200 supply AC electrical power when the rotatable shaft 130 rotates. The machines 200, 210, and 220 can be carried on second shaft portion 170 between the fourth spaced bearings 188 and the fifth spaced bearings 190. The fixed components 204, 214, and 224 can be mounted to any suitable part of either or both the first S/G housing portion 162 and second S/G housing portion 164.

As illustrated, the S/G 101 is oil cooled, and an oil inlet port 230 and an oil outlet port 232 are provided for controlling the supply of oil to and from the S/G 101. The cooling oil can be used to dissipate heat generated by the electrical and mechanical functions of the S/G 101 by flowing the oil through oil conduits 236 and 238, such that the machines 200, 210, and 220 are not coated with oil and particularly the spaces between the fixed components 204, 214, and 224 and rotating components 202, 212, and 222 are not filled with oil. Therefore, the oil that is used to cool the machines within the S/G interior 161 does not freely flow outside of designated conduits 236 and 238.

The S/G 101 further comprises an oil seal 180 that surrounds the second shaft portion 170 and is surrounded by the first housing portion 162. The oil seal prevents cooling and lubrication oil from the AGB interior 120 from entering the S/G interior 161 and also prevents any particles and debris from the S/G interior 161 from contaminating the oil in the AGB interior 120. The oil seal 180 can be more proximate to the pinion gear 140 than S/G 101.

The AGB housing 106 and the S/G housing 160 can be formed by any known materials and methods, including, but not limited to, die-casting of high strength and lightweight metals such as aluminum, stainless steel, iron, or titanium. The housing 106 and 160 can be formed with a thickness sufficient to provide adequate mechanical rigidity without adding unnecessary weight to the assembly 100 and, therefore, the aircraft.

The rotatable shaft 130 comprising the first shaft portion 132 and second shaft portion 170 can be constructed by any known materials and methods, including, but not limited to extrusion or machining of high strength metal alloys such as those containing aluminum, iron, nickel, chromium, titanium, tungsten, vanadium, or molybdenum. The diameter of the second shaft portion 170 can be fixed or vary along the length of the rotatable shaft 170. The diameter can vary to accommodate different sizes, as well as rotor to stator spacings of the various machines 200, 210, and 220.

All of the machines 200, 210, and 220 are placed on the same side of the pinion gear 140 and the exciter 210 and the PMG 200 are placed closer to the pinion gear 140 than the main machine 220; however, alternative configurations can be included. The machines 200, 210, and 220 can be any combination of known motors and generators. For example, the main machine 220 could be either a synchronous or asynchronous generator. In addition to the machines shown in this embodiment, there can be other components that can need to be operated for particular applications. For example, in addition to the electromechanical machines 200, 210, 220 shown, there can be other machines driven from the same rotatable shaft 130 such as an oil pump, a fluid compressor, or a hydraulic pump.

As described herein, either the AGB 100 or the S/G 101 can be a driving mechanism for driving the rotation of the rotating shafts 132, 170, 172. For example, during starting operations, the S/G 101 can be the driving mechanism for rotation of the rotating shafts 132, 170, 172. Alternatively, during normal gas turbine engine 1 operation, the AGB 100 can be the driving mechanism for rotation of the rotating shafts 132, 170, 172. The non-driving mechanism, that is, the equipment being driven by the driving mechanism, can be understood as rotating equipment utilizing the rotational movement of the rotating shafts 132, 170, 172, for example to generate electricity in the S/G 101.

A disconnector 192 can be disposed near the second shaft portion 170 between the third spaced bearings 184 and fourth spaced bearings 188. For example, the disconnector 192 can be mechanically coupled with a wall of the S/G housing 160 proximate to a rotatable shaft portion 132, 170, 172 between the S/G 101 and the AGB 100. The disconnector 192 can be positioned proximate to a rotatable shaft portion 132, 170, 172 and can be provided to mechanically decouple the machines 200, 210, and 220 from the pinion gear 140 and, thereby, the drive gear 150 and the AGB 100 in the case of failure of any of the machines 200, 210, 220. Failure of any of the machines 200 can include, but is not limited to, mechanical failure or thermal failure. The disconnector 192 can be more proximate to the pinion gear 140 than any of the machines 200, 210, and 220. While the disconnector 192 is shown within the S/G interior 161, alternative embodiments of the disclosure can include positioning the disconnector 192 between the S/G 101 and the AGB 100, internal to the AGB 100, or positioned anywhere along a portion of the rotating shaft 132, 170, 172.

Figure 3:
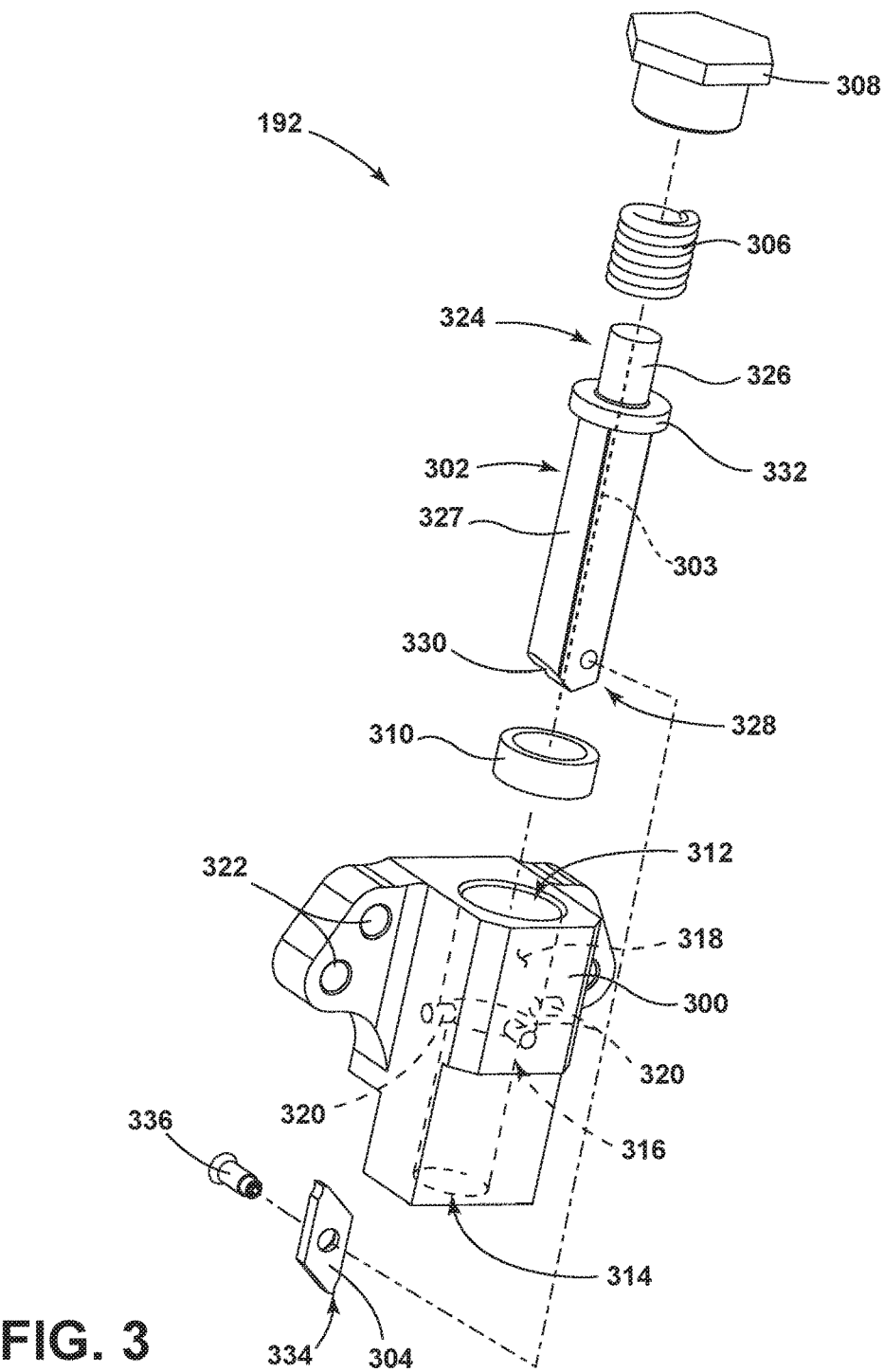
FIG. 3 is an exploded perspective view of a disconnector adapted for use with the starter/generator of FIG. 2 in accordance with various aspects described herein.

FIG. 3 illustrates an exploded perspective view of one exemplary embodiment of the disconnector 192. As shown, the disconnector 192 can include a housing 300, an arm 302, a parting tool 304, a biasing element, illustrated as a compression spring 306, a cap 308, and a meltable element 310. The meltable element 310 can comprise a material selected or configured to remain in a solid state while exposed to temperatures common to an operating S/G 101 or AGB 100. The meltable element 310 can further comprise a material selected or configured to melt at a threshold temperature indicative of a selected, indicated, or predetermined failure of the S/G 101 or AGB 100. In one non-limiting example embodiment, the meltable element 310 can comprise solder, or solder-like material containing tin, lead, indium, copper, silver, or combinations thereof, and be selected or configured to melt at or above temperatures of 180 degrees Celsius. In additional non-limiting examples, the meltable element 310 can comprise Sn96.5Ag3.5, which melts at 221 degrees Celsius. In yet another non-limiting example, the meltable element 310 can comprise a composition or material that melts between 180 and 315 degrees Celsius.

The housing 300 can include a first opening 312 at a top wall of the housing 300, and a second opening 314 at a bottom wall of the housing 300. The openings 312, 314 enable a housing shaft 316 to extend therethrough longitudinally along an interior 318 of the housing 300. The housing 300 can additionally include a set of ports 320 radially spaced about the housing shaft 316 and fluidly coupling the interior 318 of the housing 300 to the exterior of the housing 300. The housing 300 is further shown including a set of mounting apertures 322 arranged to receive a mechanical fastener, such as a screw. In this sense, the set of mounting apertures 322 allow for mounting the housing 300 of the disconnector 192 with at least one of the S/G 101, the AGB 100, the drive mechanism, or any position proximate to the rotating shaft, 132, 170, 172, as explained above. The arm 302 can define a longitudinal major body axis 303 and can include a first longitudinal end 324 having an arm head 326, a second longitudinal end 328, distal from the first end 324, having a mounting bracket 330 configured to receive the parting tool 304, and an elongated arm shaft 327 coupling the first end 324 with the second end 328. The arm 302 can also include a shoulder 332 positioned proximate to the first end 324 and separating the arm head 326 from the arm shaft 327. As illustrated, the shoulder 332 can have a wider radial structure than the arm head 326 or the arm shaft 327. As used herein, "radius" or "radial" means a distance extending away from the longitudinal major body axis of the housing 300 or arm 302.

The parting tool 304 can be a tool selected, configured, or arranged to disconnect, break, shear, shatter, or otherwise cause failure of at least a portion of the rotating shaft 132, 170, 172 proximate to the disconnector 192. In the illustrated embodiment, the parting tool 304 can include a cutting tool or a cutting head 334 selected such that physical contact between the cutting head 334 and the rotating shaft 132, 170, 172 results in the failure of the shaft 132, 170, 172. In this sense, the cutting head 334 can comprise a material having a stronger or harder composition (e.g. "hardness") than the rotating shaft 132, 170, 172 composition. As shown, the parting tool 304 can be mounted or fastened to the mounting bracket 330 of the second end 328 by way of a mechanical fastener 336, such as a screw.

Alternative embodiments of the disclosure can include a parting tool including, but not limited to, a friction head. In this alternative embodiment, the parting tool 304 having a friction head can operate such that physical contact between the friction head and the rotating shaft 132, 170, 172 generates physical friction sufficient to break, shear, or otherwise physically decouple the S/G 101 from the AGB 100. In yet another alternative embodiment of the parting tool 304 having a friction head, the friction head can operate such that physical contact between the friction head and the rotating shaft 132, 170, 172 generates heat from the friction sufficient to melt, heat, or otherwise cause a thermal failure in the shaft 132, 170, 172 to physically decouple the S/G 101 from the AGB 100.

Figure 4:
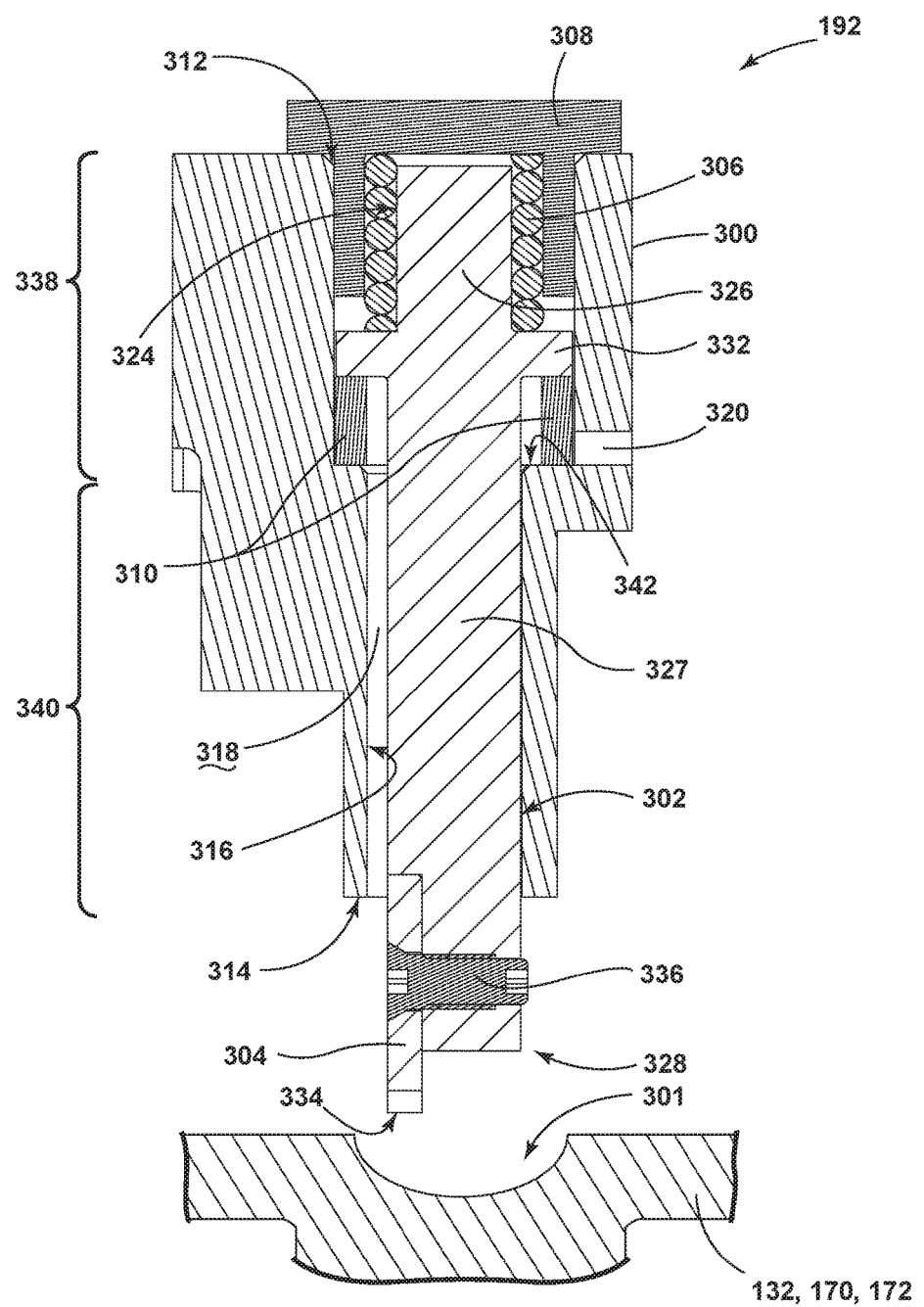
FIG. 4 is a sectional view of the disconnector of FIG. 3 in a first position relative to the rotating shaft, in accordance with various aspects described herein.

FIG. 4 illustrates a cross-sectional view of the assembled disconnector 192 of FIG. 3, relative to a portion of the rotating shaft 132, 170, 172. The rotating shaft 132, 170, 172, as illustrated, can include a weak segment 301, or a sacrificial segment, proximate to the parting tool 304. The weak segment 301 is selected or configured to provide a controlled or predetermined region for failure of the shaft 132, 170, 172 at the segment 301, in response to exposure of the parting tool 304 contacting the segment 301.

The disconnector 192 is illustrated in a first position, wherein the meltable element 310 is intact, that is, wherein the meltable element 310 is not melted. The housing shaft 316 can define a first axial portion 338 proximate to the top wall of the housing 300 and having a first radius corresponding with the first opening 312, and a second axial portion 340 proximate to the bottom wall of the housing 300 and having a second radius corresponding with the second opening 314. In the illustrated embodiment, the first opening 312 and the first axial portion 338 has a greater radius than the second opening 314 and the second axial portion 340.

The first opening 312 can be sized to receive, serially, the meltable element 310, the arm 302, and the compression spring 306. The arm head 326 can be sized or configured such that it can be received by, or received within, an interior radius of the compression spring 306. The meltable element 310 can be sized relative to the housing 300 such that the meltable element 310 can be thermally coupled, that is, in a thermally conductive relationship, with the housing 300. The meltable element 310 can also be sized or configured such that it can receive the arm shaft 327, but abut the arm shoulder 332. As shown, when the disconnector 192 is assembled, the meltable element 310 can be positioned proximate to the set of ports 320.

The second opening 314 can be sized to receive the parting tool 304 and the arm shaft 327. Alternatively, the second opening 314 can be sized to receive the arm shaft 327, and the parting tool 304 can be mounted to the second end 328 of the arm 302 after assembly. In this sense, during assembly, the arm 302 is received into the first opening 312 of the housing 300 and the second end 328 of the arm 302 is extended through the interior 318 of the housing 300 and emerges via the second opening 314. The shoulder 332 of the arm 302 can be sized or configured such that it can be received by, or received within the first axial portion 338, but it cannot be received by the second axial portion 340. Stated another way, the shoulder 332 is sized such that, in the absence of the meltable element 310, it can will abut an interior housing surface 342.

The cap 308 can be sized, keyed, or configured to be at least partially and fixedly received or mounted in the first opening 312 such that the cap 308, when assembled, compresses the compression spring 306 between the cap 308 and the shoulder 332 of the arm 302. The shoulder 332 of the arm 302 is further restrained by the meltable element abutting the interior housing surface 342. As described, the compression spring 306 is mounted relative to the housing 300 by the cap 308 and configured to bias the arm 302 away from the cap 308, that is, in a downward direction relative to FIG. 4, toward the rotating shaft 132, 170, 172.

While not shown, the assembled disconnector 192 can be mounted relative to the AGB 100, the S/G 101, or a wall thereof, such that the disconnector 192 is radially spaced from the rotating shaft 132, 170, 172 while the disconnector 192 is in the first position.

During operation of the AGB 100 or the S/G 101, heat generated by the respective assemblies 100, 101 can be thermally conducted by way of any intervening walls or structures to the housing 300 of the disconnector 192. At least a portion of the heat thermally conducted to the housing 300 can be further conducted to the meltable element 310, as described herein. During normal AGB 100 or S/G 101 operations, the heat generated by the respective components 100, 101 insufficient to melt the meltable element 310. In this sense, during normal AGB 100 or S/G 101 operations, the disconnector 192 is retained in the first position (illustrated in FIG. 4) by the meltable element such that the parting tool 304 is prevented from contacting the rotating shaft 132, 170, 172.

During an AGB 100 or S/G 101 failure, such as a bearing failure of the respective assembly 100, 101, the operating temperature of the failed assembly 100, 101 can rise to a higher temperature compared with the aforementioned normal operation. The increase in heat generated by the failed assembly 100, 101 will in turn, conduct more heat to the meltable element 310, by way of the housing 300. As explained above, the meltable element 310 can be selected or configured to melt at a threshold temperature, or a predetermined threshold temperature, indicative of a failure of the respective failed assembly 100, 101. In this sense, the failure of the respective assembly 100, 101 causes the meltable element 310 of the disconnector 192 to melt.

Figure 5:
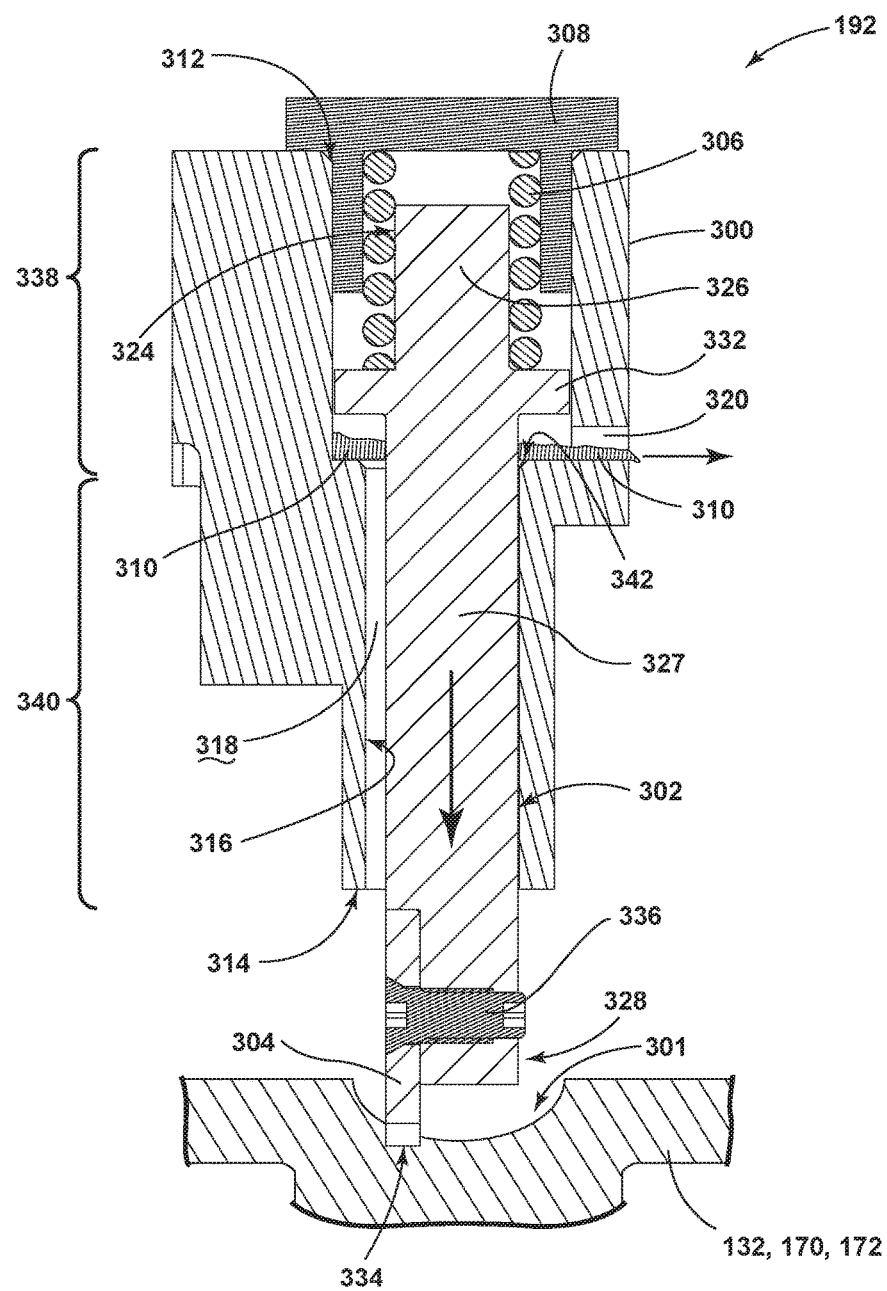
FIG. 5 is a sectional view of the disconnector of FIG. 3 in a second position contacting the rotating shaft, in accordance with various aspects described herein.

FIG. 5 illustrates cross-sectional view of the assembled disconnector 192 of FIG. 4 in a second position wherein the failure of at least one of the AGB 100 or S/G 101 has generated sufficient heat to melt the meltable element 310. As the meltable element 310 melts, the shoulder 332 of the arm 302 is no longer retained or restrained in the first position. As shown, the meltable element 310 can flow out of the set of ports 320. The bias of the compression spring 306 pushes the arm downward (relative to FIG. 5) such that the parting tool 304 extends toward the weak segment 301 of the rotating shaft 132, 170, 172.

While in the second position, the parting tool 304 or the cutting head 334 will contact the rotating shaft 132, 170, 172 at, for instance, the weak segment 301. The compression spring 306 can be configured to force the parting tool 304 in contact with the weak segment 301 or the rotating shaft 132, 170, 172 with such force as to cut, damage, shatter, or otherwise cause the predetermined failure of the respective portion or segment 301 of the shaft 132, 170, 172. Alternatively, the compression spring 306 can be configured to continuously force or "hold" the parting tool 304 in contact with the weak segment 301 or the rotating shaft 132, 170, 172, such that the continued contact between the tool 304 and the respective segment 301 or shaft 132, 170, 172 cuts, scrapes, weakens, or thermally heats the segment 301 or shaft 132, 170, 172 by way of friction, leading to the eventual predetermined failure of the segment 301 or shaft 132, 170, 172.

While not shown, the assembled disconnector 192 can be mounted relative to the AGB 100, the S/G 101, or a wall thereof, such that the disconnector 192 is radially spaced from the rotating shaft 132, 170, 172 while the disconnector 192 is in the first position. The mounting of the assembled disconnector 192 can further be configured such that the parting tool 304 of the disconnector 192 makes contact with the rotating shaft 132, 170, 172 while the disconnector 192 is in the second position. Additionally, the longitudinal length of one or more of the components, including but not limited to the arm 302, the parting tool 304, or the meltable element 310, can be selected or configured to ensure the radial spacing in the first position and the contact in the second position.

Thus embodiments of the above disclosure enable a disconnector 192 mounted relative to a rotating shaft 132, 170, 172, 301, wherein a failure of a driving mechanism (e.g. the AGB 100, or S/G 101) causes the meltable element 310 to melt and release the arm 302 from a first position to a second position. The releasing of the arm 302 for movement to the second position along the longitudinal axis causes the parting tool 304 to contact the rotating shaft 132, 170, 172, 301, causing a predetermined failure of the shaft 132, 170, 172, 301.

Figure 6:
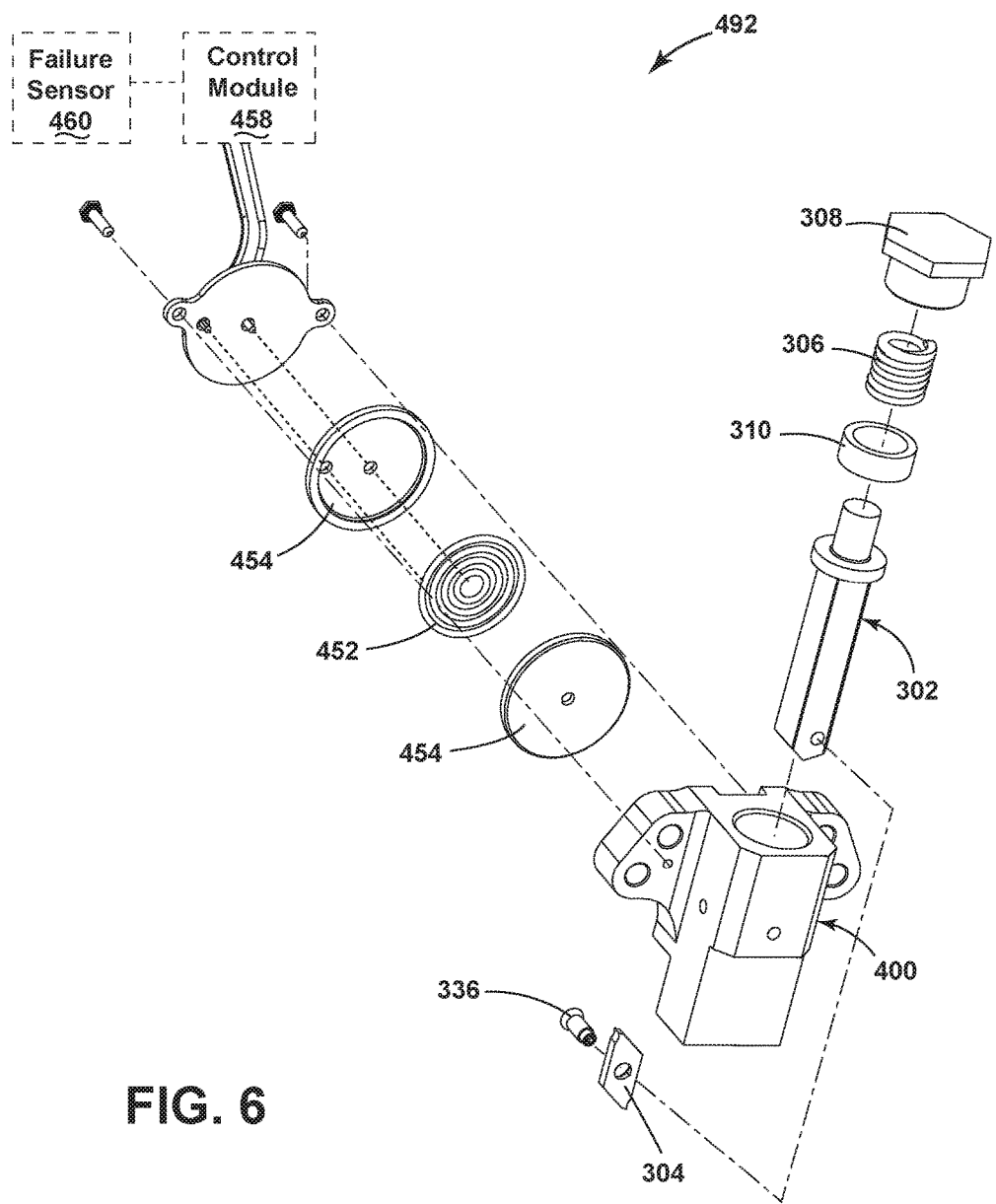
FIG. 6 is an exploded perspective of another embodiment of a disconnector in accordance with various aspects described herein.

FIG. 6 illustrates an alternative disconnector 492 according to a second embodiment of the disclosure. The second embodiment is similar to the first embodiment; therefore, like parts will be identified with like numerals, with it being understood that the description of the like parts of the first embodiment applies to the second embodiment, unless otherwise noted. A difference between the first embodiment and the second embodiment is that the second embodiment of the disconnector 492 can include a controllable heating element 450 thermally coupled with the disconnector 492 housing 400. As illustrated, the controllable heating element 45 can include a heating coil 452 and at least one ceramic plate 454 mounted with a back wall 456 of the housing 400.

A controller module 458 can be energizably coupled with heating coil 452 and at least one failure sensor 460 configured to sense or indicate a failure of at least one of the AGB 100 or the S/G 101 (i.e. the driving mechanism or the rotating equipment). In this sense, the controller module 458, in response to receiving a failure indication from the failure sensor 460, can enable or energize the heating coil 452 to generate heat in the coil 452, the at least one ceramic plate 454, or the housing 400. The energizing of the heating coil 452 can generate a sufficient heat to melt the meltable element 310, resulting in the movement of the disconnector 492 from the first position to the second position, causing the predetermined failure of the rotating shaft 132, 170, 172, 301, as explained herein. As used herein, the failure sensor 460 can include and sensor or system configured to indicate a failure of the driving mechanism or the rotating equipment. For example, the failure sensor 460 can include sensing a condition of the driving mechanism or the rotating equipment, and send a signal representative of the condition from the sensor 460 to the controller module 458. The controller module 458 can also determine that a failure is or has occurred based on the representative signal, and initiate the energizing of the heating element 450.

As described herein, a difference between the first embodiment and the second embodiment can include that the first embodiment of the disclosure is a passive disconnector 192, that is, the disconnector 192 includes receiving heat generated by the driving mechanism or the rotating equipment. Conversely, the disconnector 492 of the second embodiment can include an active system, that is, a system that generates a self-sufficient amount of heat to operate the disconnector 492.

Embodiments of the disclosure can include configurations wherein the disconnector 192, 492 can include, but is not limited to, a resettable disconnector 192, 492. For instance, after causing a predetermined failure in the shaft 132, 170, 172, 301, the disconnector 192, 492 can be "reset" by replacing the meltable element 310, replacing the parting tool 304 or cutting head 334 (if needed), and reassembling the disconnector 192, 492 to the first position. Additionally, embodiments of the disclosure can include a shroud or shield isolating the predetermined failure of the shaft 132, 170, 172, 301 from the AGB 100, S/G 101, or the combination thereof. In this sense, the shroud or shield can be configured to contain the particles or debris generated by the destruction of the shaft 132, 170, 172, 301 during decoupling of the driving mechanism from the rotating equipment. It can be desirable to prevent these particles or debris from contaminating the cooling or lubrication oil in the AGB 100 or S/G 101.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Many other possible embodiments and configurations in addition to that shown in the above figures are contemplated by the present disclosure. Additionally, the design and placement of the various components such as S/G, AGB, or components thereof can be rearranged such that a number of different in-line configurations could be realized.

The embodiments disclosed herein provide a disconnector for disconnecting a drive shaft of a drive mechanism from rotating equipment. One advantage that can be realized in the above embodiments is that the above described embodiments utilize the rotation of the shaft in contact with the parting tool to damage, cut, break, shatter, or otherwise separate the drive mechanism from the rotating equipment. Another advantage of the above embodiments is that embodiments of the disclosure enable a passive disconnector configuration, wherein heat provided to enable the disconnector to separate the drive mechanism form the rotating equipment originates from at least one of the drive mechanism or the rotating equipment. The embodiments of the disclosure can also enable an active disconnector configuration such that a heat-generating component or a heat source can actively provide the heat to enable the disconnector to operate as described, in response to a control signal. The active disconnector configuration can also enable disconnection of the drive mechanism from the rotating equipment under when non-thermal issues, problems, or errors are sensed or detected.

Yet another advantage of the above embodiments is that the disconnecting of the drive mechanism and the rotating equipment can prevent failure or damage of the operating equipment by the failed equipment. For example, in the event of an S/G failure, the disconnector can disconnect the S/G from the AGB prior to the failure affecting the AGB, and thus, limiting the damage to further systems. By limiting the damage to further systems, repair or maintenance costs are reduced compared with a cascading failure of rotating systems without a disconnector. Yet another advantage of the above embodiments is that the disconnector is a "resettable" device, that is, after enabling the movement of the disconnector from the first position to the second position, the disconnector can be reinstalled by, for example, replacing the meltable element or parting tool, if needed. The resettability of the disconnector allows for reduced operating costs over the lifespan of the disconnector.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A disconnector for disconnecting a drive shaft of a drive mechanism from rotating equipment, upon a failure of the drive mechanism or rotating equipment, comprising:
   a housing,
   an arm extending from the housing and movable relative to the housing between a first position and a second position,
   a parting tool on a distal end of the arm;
   a biasing element mounted to the housing adjacent a proximal end of the arm configured to bias the arm toward the second position; and
   a meltable element disposed in the housing in a position to restrain the arm in the first position against the bias of the biasing element;
   wherein when the housing is mounted to at least one of a drive mechanism or rotating equipment, radially spaced from a drive shaft such that the parting tool will contact the drive shaft when the arm is in the second position, a failure in the at least one of the drive mechanism or rotating equipment will cause the meltable element to melt and release the arm for movement to the second position where the parting tool contacts the drive shaft causing a predetermined failure of the drive shaft at the point of contact.

2. The disconnector of claim 1 wherein the meltable element is configured to melt at a threshold temperature.

3. The disconnector of claim 2 wherein the threshold temperature is achieved by heat transfer through the at least one of the drive mechanism or rotating equipment.

4. The disconnector of claim 2 further comprising a heating element thermally coupled with the meltable element, and a failure sensor connected to the heating element, wherein when the failure sensors detects a failure, the heating element is energized to at least the threshold temperature.

5. The disconnector of claim 1 wherein the parting tool includes a cutting tool.

6. The disconnector of claim 1 wherein the arm is an elongated shaft with a longitudinal axis and movement between the first and second positions is along the longitudinal axis.

7. The disconnector of claim 1 wherein the biasing element is a spring.

8. A system of a drive mechanism coupled to a device by a rotating shaft comprising:
   a housing mounted to one of the drive mechanism or the device radially from the rotating shaft;
   an arm extending from the housing and movable relative to the housing between a first position and a second position;
   a parting tool on a distal end of the arm;
   a biasing element mounted to the housing adjacent a proximal end of the arm configured to bias the arm toward the second position; and
   a meltable element disposed in the housing in a position to restrain the arm in the first position against the bias of the biasing element;
   wherein a failure in one of the drive mechanism or the device will cause the melting element to melt and release the arm for movement to the second position where the parting tool of the meltable element will contact the rotating shaft and cause a predetermined failure of the rotating shaft at the point of contact to decouple the drive mechanism from the device.

9. The system of claim 8 wherein the meltable element is configured to melt at a threshold temperature.

10. The system of claim 9 wherein the threshold temperature is achieved by heat transfer to the housing.

11. The system of claim 9 further comprising a heating element thermally coupled with the meltable element, and a failure sensor connected to the heating element, wherein when the failure sensor detects a failure and the heating element is energized to at least the threshold temperature.

12. The system of claim 8 wherein the parting tool includes a cutting tool.

13. The system of claim 8 wherein the arm is an elongated shaft with a longitudinal axis and movement between the first and second positions is along the longitudinal axis.

14. The system of claim 8 wherein the biasing element is a spring.

15. A method of protecting a system from a catastrophic failure where the system includes a drive mechanism coupled to a device by a rotating shaft, the method comprising:
   disposing a housing on one of the drive mechanism or the device radially from the rotating shaft, with an arm extending from the housing and movable relative to the housing between a first position and a second position, a parting tool on a distal end of the arm, a biasing element mounted to the housing adjacent a proximal end of the arm configured to bias the arm toward the second position; and a meltable element disposed in the housing in a position to restrain the arm in the first position against the bias of the biasing element; and if a failure is detected in one of the drive mechanism or the device; and
   causing the meltable element to melt and release the arm for movement to the second position where the parting tool of the meltable element will contact the rotating shaft and cause a predetermined failure of the rotating shaft at the point of contact to decouple the drive mechanism from the device.

16. The method of claim 15 wherein causing the meltable element to melt includes transferring heat from the failure to the meltable element.

17. The method of claim 15 wherein causing the meltable element to melt includes sensing a failure and energizing a heating element in the housing.

18. The method of claim 17 further comprising sensing a condition of one of the drive mechanism or the device by a sensor, sending a signal representative of the condition from the sensor to a controller, determining in the controller that a failure is occurring, and sending from the controller a signal to energize the heating element.

19. The method of claim 15 wherein the predetermined failure of the rotating shaft includes cutting the rotating shaft with the parting tool.

20. The method of claim 15 wherein the arm is an elongated shaft with a longitudinal axis and movement between the first and second positions is along the longitudinal axis.

* * * * *